Figure 1:
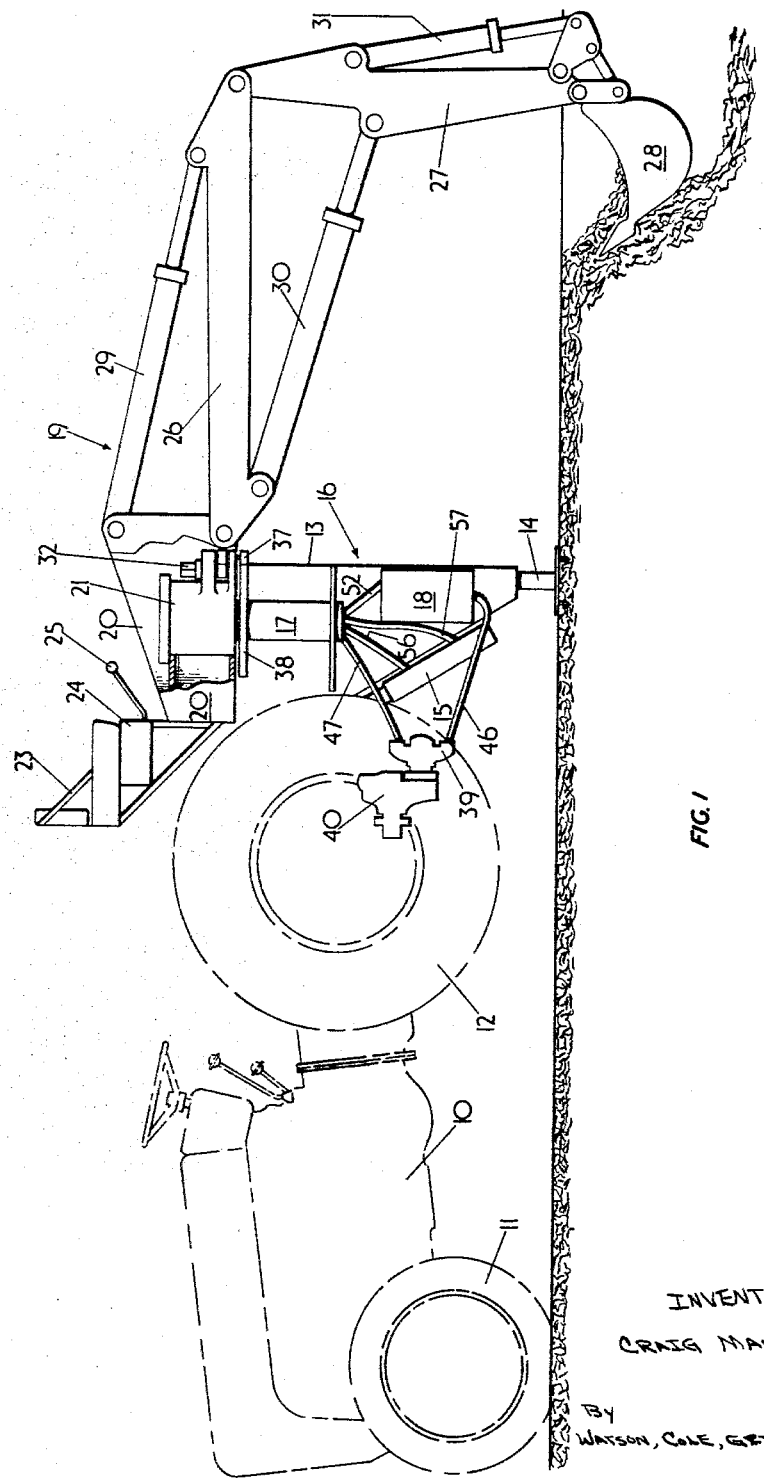

INVENTOR
CRAIG MARNER
BY WATSON, COLE, GRINDLE + WATSON
ATTORNEYS

May 31, 1966 C. MARNER 3,253,724
TRACTOR-OPERATED LOADING AND LIKE MECHANISMS
Filed March 23, 1965 2 Sheets-Sheet 2

INVENTOR
CRAIG MARNER
BY
WATSON, COLE, GRINDLE & WATSON
ATTORNEYS

United States Patent Office 3,253,724
Patented May 31, 1966

3,253,724
TRACTOR-OPERATED LOADING AND LIKE MECHANISMS
Craig Marner, Exning, near Newmarket, Suffolk, England, assignor to Ernest A. Webb Limited, Exning, near Newmarket, England, a British company
Filed Mar. 23, 1965, Ser. No. 442,034
Claims priority, application Great Britain, Apr. 17, 1964, 16,043/64
3 Claims. (Cl. 214—138)

This invention relates to a tractor of the type having a rear mounted stand supporting a hydraulically controlled implement, such for example as an excavating bucket, which is mounted for slewing movement in relation to the stand.

It is desirable to provide for slewing movement of the implement through 360° in relation to the stand, so as to enable the implement to pick up and discharge materials at positions spaced from the tractor in any direction, but this cannot be achieved when the slewing movement is imparted hydraulically by liquid conveyed through tubes between the stationary and rotatory parts of the apparatus.

The invention provides a tractor of the above type, in which the implement and hydraulic motive mechanism for actuating the implement are mounted on a rotatable structure including a sleeve mounted for rotation, through 360° continuously in both directions, upon the stand and defining between itself and the stand two superposed annular chambers, said motive mechanism including a hydraulic motor for rotating the sleeve on the stand and at least one hydraulic jack for actuating the implement, a pump and a reservoir mounted on the tractor or stand, a flow pipe from the pump which communicates by a duct in the stand with one of the annular chambers, a return pipe to the reservoir which communicates by another duct with the other annular chamber, pressure and return pipes on the rotatable structure which are respectively connected by ports in the sleeve to the annular chamber connected to the flow line and to the annular chamber connected to the return line, and independently operable control valves on the rotatable structure, one for the motor and one for each jack, each valve being movable from a neutral position to effect movement in a selected direction of the motor or jack as the case may be.

Preferably the tractor includes a hydraulic jack on the tractor for raising and lowering the stand in relation to the tractor, a further control valve on the rotatable structure, pipes on the rotatable structure which are selectively connectable to the pressure and the return pipes by the further control valve and which communicate, by ports in the sleeve, each with one of two further annular chambers between the sleeve and the stand, and ducts in the stand which connect these sleeves respectively to opposite ends of said hydraulic jack.

Figure 2:
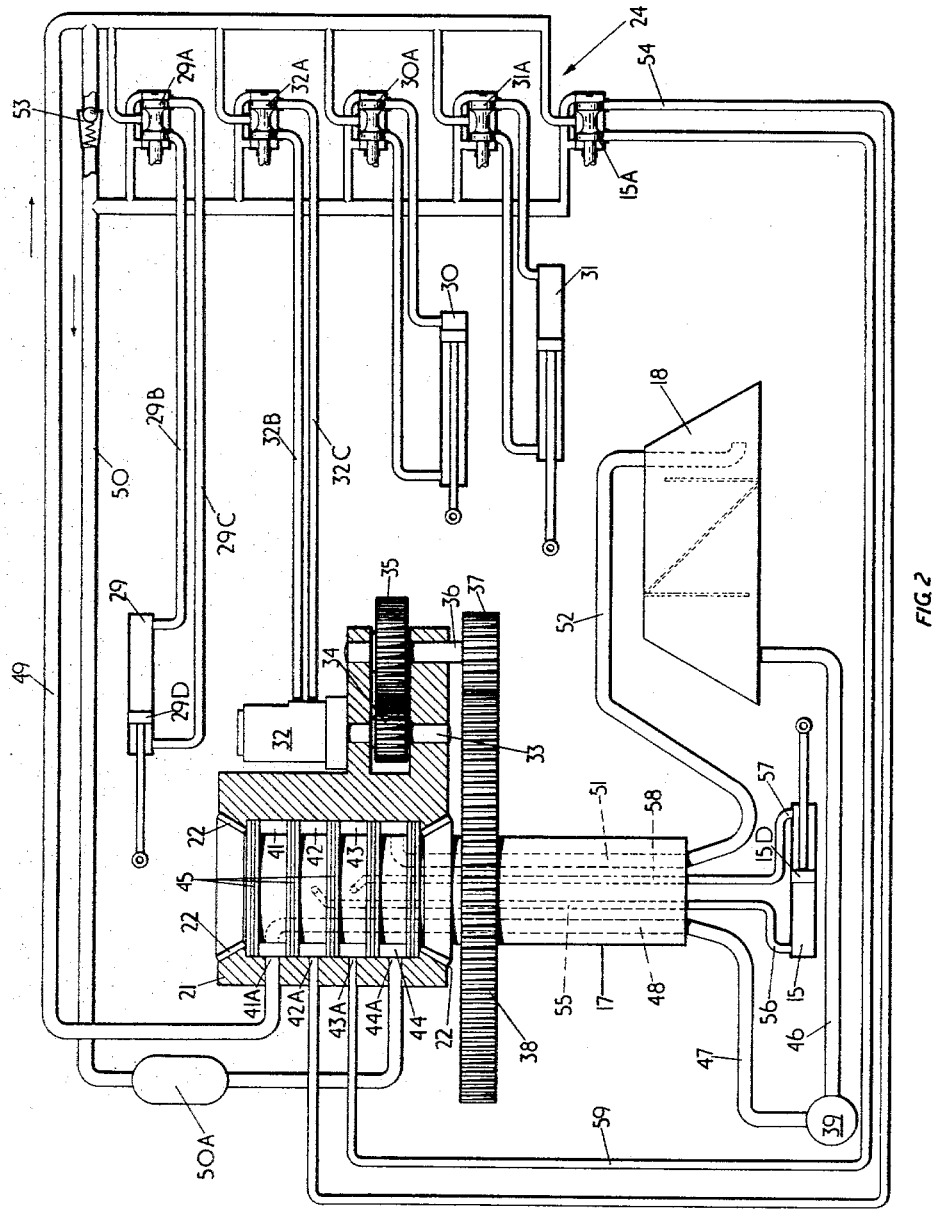

One embodiment of the invention will now be described in detail, by way of example, with reference to the accompanying drawings, in which:

FIG. 1 is a side elevation showing a tractor and associated stand and loading implement, and FIG. 2 is a diagram showing the hydraulic actuating mechanism for the loading element.

The tractor 10 shown in FIG. 1 has front and rear wheels 11, 12 and has attached to its rear end a stand 16 which includes two side plates 13 (one of which is omitted from FIG. 1 in order to show parts accommodated between the side plates) each having a leg 14. A hydraulic jack 15 is provided, which is interconnected between the tractor 10 and the stand 16 as described in my corresponding United States Application No. 427,261, January 22, 1965, now abandoned and is operable to lower the stand in relation to the tractor to cause the rear wheels 12 of the tractor to be lifted off the ground, as shown in FIG. 1, with part of the weight of the tractor imposed on the legs 14 of the stand, or to raise the stand and return the rear wheels 12 to ground level. The stand 16 includes an upright support or post 17 and carries an oil reservoir 18.

The post 17 supports a superstructure including an excavator attachment 19 supported by side plates 20, attached to a sleeve 21, which is rotatably mounted on roller bearings 22 (FIG. 2) on the upper part of the support 17. Attached to the side plates 20 are a seat 23 for the operator and a control valve box 24 containing a number of control valves described later, each of which is provided with an operating handle 25. The attachment 19 includes the usual main boom 26, dipper arm 27 and bucket 28, a hydraulic jack 29 for actuating the main boom 26, a hydraulic jack 30 for actuating the dipper arm 27 and a hydraulic jack 31 for actuating the bucket 28. The attachment 19 can be caused to rotate through 360° in relation to the support 17 by a hydraulic motor 32 (FIG. 2) mounted on the sleeve 21. The shaft 33 of the motor 32 carries a gear 34, meshing with a gear 35 on a shaft 36 which carries another gear 37 meshing with a fixed gear 38 on the support 17. Upon operation of the motor 32, the attachment 19 will accordingly rotate in relation to the fixed part of the structure.

Motive power for actuating the motor 32 and the jacks referred to above, is provided by a pump 39 on the tractor, which is driven through a gear box 40 from a power takeoff (not shown).

As shown in FIG. 2, four chambers 41, 42, 43, 44, are provided in the interior of the sleeve 21, these chambers surrounding the upper part of the support 17. The chambers are defined at top and bottom by oil seals 45. The chambers 41, 42, 43, 44 communicate respectively, in all positions of rotational adjustment of the sleeve 21, with radial ports 41A, 42A, 43A and 44A in the sleeve.

The pump 39 draws oil from the reservoir 18 through a pipe 46 and delivers oil under pressure, through a pipe 47 and a duct 48 in the support 17, to the chamber 41 from which oil flows through the port 41A to a main pressure pipe 49 on the rotatable part of the structure. A return pipe 50 on the rotatable part of the structure, in which is provided a filter 50A, communicates with a port 44A and thence, via the chamber 44, a duct 51 in the support 17 and a pipe 52 on the fixed part of the structure with the reservoir 18.

The control valve box 24 (FIG. 1) contains five control valves 15A, 29A, 30A, 31A and 32A (FIG. 2) which are respectively associated with the jacks 15, 29, 30, 31 and with the motor 32. When all these valves occupy the neutral position shown in FIG. 2 the pump 39 circulates oil idly through the system by reason of opening of a relief valve 53 between the pipes 49, 50. When any one of the valves is shifted from its neutral position, the relief valve 53 will close and oil will pass from the pressure pipe 49 through the shifted valve to the associated jack or motor which, in turn, displace oil to the return pipe 50.

Thus, if the valve 29A is shifted, oil will pass from the pressure line 49, through one or other of pipes 29B, 29C to cause movement of the piston 29D of the jack 29 to displace oil to the return pipe 50 through the other pipe. The jacks 30 and 31 will be actuated, in a direction corresponding to the direction of shifting of their associated valves 30A or 31A, in a precisely similar manner. Similarly, shifting of the valve 32A will connect one of pipes 32B, 32C to the pressure pipe 49 and the other to the return pipe 50, so causing the motor 32 to rotate in a direction determined by the direction of displacement of the valve 32A.

Actuation of the jack 15 in response to the shifting of the valve 15A involves flow of liquid from a valve on a rotating part of the structure to a jack on the stationary part of the structure and is accomplished as follows:

If the valve 15A is shifted to the right as seen in FIG. 2, oil will flow from the pressure pipe 49 through a pipe 54 to the port 42A and thence, through the chamber 42, a duct 55 in the support 17 and a pipe 56 to the left hand side of the jack 15, so causing the jack piston 15D to move to the right, displacing oil through a pipe 57 and a duct 58 in the support 17 to the chamber 43 and thence, through the port 43A and a pipe 59 back through the valve 15A, to the return pipe 50. It will be clear that, when the valve 15A is shifted to the left, oil will flow through it in the reverse direction to cause the piston 15D to move to the left.

What I claim as my invention and desire to secure by Letters Patent is:

1. A tractor-mountable stand carrying an excavating implement and comprising a post, a superstructure supporting said excavating implement and including a sleeve mounted for rotation on said post through 360° in both directions, upper and lower bearings interposed between said sleeve and said post, seals between said sleeve and said post which subdivide a space between said sleeve and said post into a plurality of superposed annular chambers, hydraulic motive mechanism for actuating said implement which is mounted on said superstructure and includes a hydraulic motor connected to rotate said sleeve on said post, and at least one hydraulic jack connected to actuate said implement, a pump and a reservoir mounted on the stand, a flow pipe from the pump which communicates by a duct in the post with one of said annular chambers, a return pipe to the reservoir which communicates by another duct in the post with another of said annular chambers, pressure and return pipes on the superstructure which are respectively connected by ports in the sleeve to the annular chamber connected to the flow line and to the annular chamber connected to the return line, and independently operable control valves on the superstructure, one for the motor and another for said jack, said one and said other valves being movable from a neutral position to effect movement in a selected direction of said motor and said jack, respectively.

2. A tractor-mountable stand as claimed in claim 1, which includes a gear fixed to the post and a gear which is driven by said hydraulic motor, is rotatably mounted in the sleeve and meshes with the gear fixed to the post.

3. The combination, with a tractor, of a stand as claimed in claim 1, said combination including a hydraulic jack on the tractor for raising and lowering the stand in relation to the tractor, a further control valve on the superstructure, pipes on the superstructure which are selectively connectable to the pressure and the return pipes by the further control valve and which communicate by ports in the sleeve, each with one of two further of said annular chambers, and ducts in the post which connect said further annular chambers respectively to opposite ends of said hydraulic jack on the tractor.

References Cited by the Examiner

UNITED STATES PATENTS

| 2,768,499 | 10/1956 | Pilch | 214—138 X |
| 2,959,260 | 11/1960 | Johnson et al. | 214—38 X |
| 3,034,670 | 5/1962 | Lafian | 214—138 |

FOREIGN PATENTS

| 927,879 | 6/1963 | Great Britain. |

HUGO O. SCHULZ, *Primary Examiner.*